United States Patent [19]

Masse

[11] Patent Number: 4,671,952
[45] Date of Patent: Jun. 9, 1987

[54] VAPORIZING LIQUID SULFUR DIOXIDE WITH MICROWAVE RADIATION

[75] Inventor: Gary M. J. Masse, Burlington, Canada

[73] Assignee: C-I-L Inc., North York, Canada

[21] Appl. No.: 918,620

[22] Filed: Oct. 14, 1986

Related U.S. Application Data

[63] Continuation of Ser. No. 703,401, Feb. 20, 1985, abandoned.

[51] Int. Cl.$^4$ .......................... C01B 17/48; H05B 6/64
[52] U.S. Cl. ................................. 423/539; 204/157.43; 204/157.49; 219/10.55 M; 219/10.57
[58] Field of Search .............. 423/521, 522, 532, 531, 423/539; 204/157 H, 157 M, 157.43, 157.49; 219/10.55 M, 10.57, 10.55 R

[56] References Cited

U.S. PATENT DOCUMENTS

| 3,577,322 | 5/1971 | Nesbitt et al. | 219/10.55 M |
|---|---|---|---|
| 3,771,234 | 11/1973 | Forster et al. | 219/10.55 M |
| 3,963,892 | 6/1976 | Camph et al. | 219/10.55 M |
| 4,055,001 | 10/1977 | Forster et al. | 219/10.55 M |
| 4,163,140 | 7/1979 | Bardet | 219/10.55 M |
| 4,310,739 | 1/1982 | Hatem | 219/10.55 M |
| 4,313,786 | 2/1982 | Smith | 219/10.55 M |
| 4,364,859 | 12/1982 | Ohtsuka et al. | 219/10.55 M |
| 4,417,116 | 11/1983 | Black | 219/10.55 M |
| 4,434,345 | 2/1984 | Muscat et al. | 219/10.57 |

OTHER PUBLICATIONS

Copson, David A. Microwave Heating in Freeze-Drying Electronic Outputs & Other Applictions, Avi Publishing Co., Westport, Conn. 1962, pp. 371-373.
Kirk Othmer, Encyclopedia of chemical Technology Third Edition 1981, John Wiley & Son, NY, NY, pp. 494-498, 516-517.
Cord et al., Microwave Spectral Tables, National Bureau of Standards Monograph 70, vol. IV, Oct. 68, pp. 385-386.

Primary Examiner—Gary P. Straub
Attorney, Agent, or Firm—Cushman, Darby & Cushman

[57] ABSTRACT

Process and apparatus for the generation of sulphur dioxide vapor from contaminated liquid sulphur dioxide. The process allows of utilization of contaminated liquid sulphur dioxide and comprises subjecting liquid sulphur dioxide feed to microwave energy for a sufficient period of time to produce sulphur dioxide vapor, collecting said vapor and removing resultant contaminated liquid sulphur dioxide, if any.

4 Claims, 2 Drawing Figures

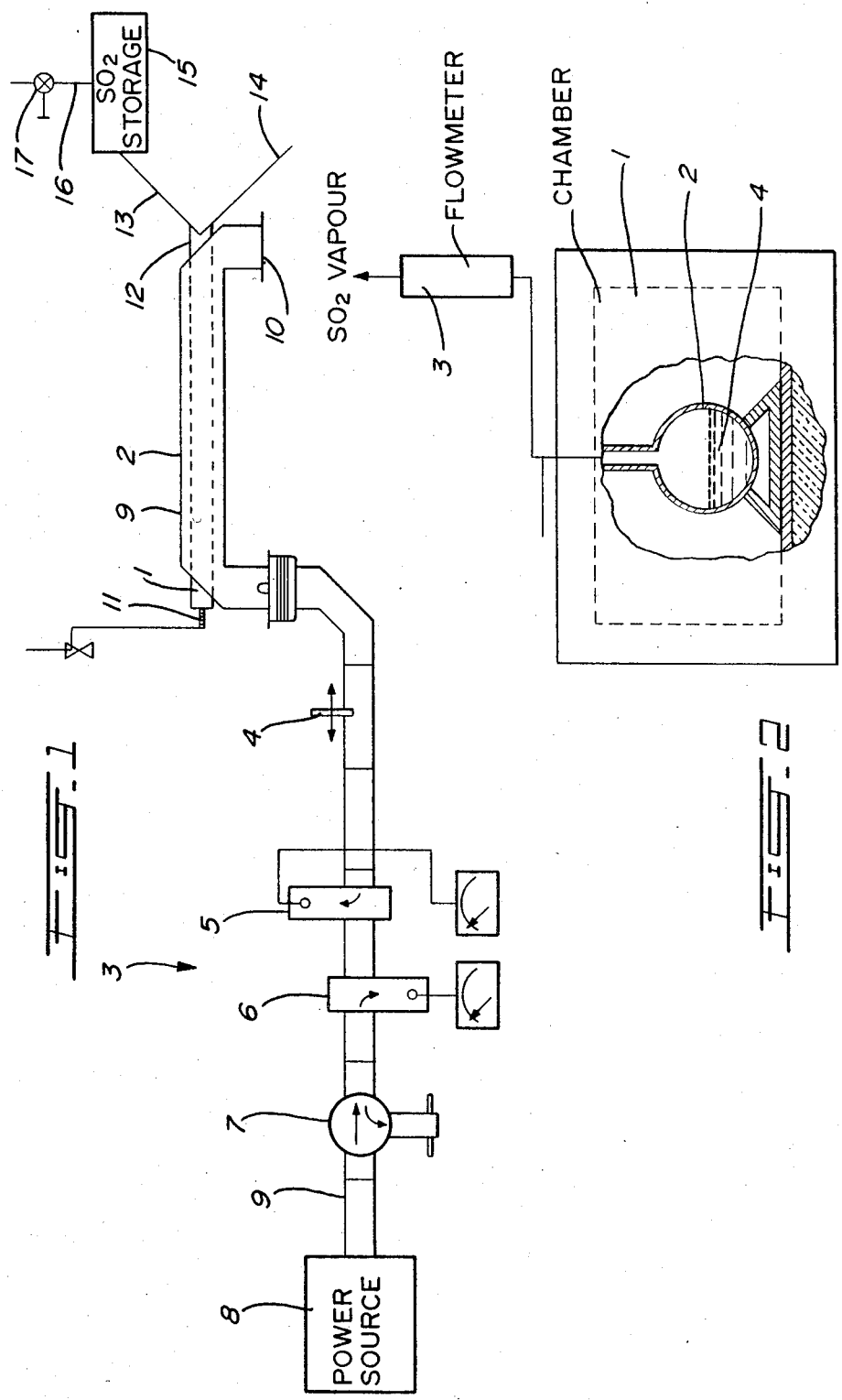

VAPORIZING LIQUID SULFUR DIOXIDE WITH MICROWAVE RADIATION

This is a continuation of application Ser. No. 703,401, filed Feb. 20, 1985, which was abandoned upon the filing hereof.

This invention relates to a process for the generation of sulphur dioxide vapour from liquid sulphur dioxide using microwave energy.

Liquid sulphur dioxide is a versatile chemical with many uses, both as a liquid, but more importantly, as a convenient source of high strength gaseous sulphur dioxide.

Liquid sulphur dioxide is often the best source of low strength sulphur dioxide gas since it is simpler to handle and involves less capital investment than the 'on-site' production from sulphur with the use of a sulphur burner. Of the plethora of uses for sulphur dioxide, for example, as an oxidizing agent, a reducing agent, a pH controller, a purifying agent and preservative, a germicide, a bleaching chemical, a refrigerant, a heat transfer fluid and selective solvent, it is generally used in its gaseous form.

To produce gaseous sulphur dioxide heat must be transmitted to the liquid sulphur dioxide. There are three fundamental types of heat transfer, namely, conduction, convection and radiation.

Conduction is the transfer of heat from one part of a solid body to another part of the same body. Convection is the transfer of heat from one point to another within a fluid by the mixing of one portion of the fluid with another. Radiation is the transfer of heat from one body to another not in physical contact with each other by means of wave motion through space. The application of the principles of heat transfer to accomplish a certain engineering objective, such as vaporizing liquid sulphur dioxide, involves a variety of parameters such as materials of construction, thermal conductivity, size as well as economic variables.

In the current art, the primary modes of heat transfer are conduction and convection. In such systems, heat is transferred across a wall with a temperature differential of $\Delta T$. The overall heat transfer by combined conduction and convection is frequently expressed in terms of an overall heat transfer coefficient, U, defined by the relation $$q = U \, A \, \Delta T \text{ overall}$$

where A is some suitable area for heat flow. In most practical problems, the conduction resistance is small compared with the convection resistances.

After a period of operation the heat transfer surfaces of a heat exchanger may become coated with various deposits present in the flow systems or the surfaces may become corroded as a result of interaction with the fluids.

Generally, corrosion becomes an increasing problem with increasing temperature. The current art requires that the wall temperature must, by definition, be hotter than the bulk liquid being vaporized.

Deposits in the fluid stream and the products of corrosion of the heat exchanger material represent an additional resistance to heat flow and thus decrease overall heat transfer performance. The overall effect is usually represented by a fouling factor, or fouling resistance, $R_f$, which must be included with other thermal resistances making up the overall heat transfer coefficient:

$$R_f = (1/U \text{ dirty}) - (1/U \text{ clean})$$

Depending on the nature of the fluid being vaporized, fouling factors can be more important and play a greater role in the thermal transfer coefficients than the inherent characteristics of the heat transfer materials of construction. This requires heat exchangers to be designed much larger than required, which translates into added capital cost, or that the heat exchangers must be isolated and cleaned to remove the material responsible for the fouling. This results in added cost and lower productivity.

We have now discovered a process for the vaporization of sulphur dioxide which is readily applicable to liquid sulphur dioxide containing relatively large levels of nonvolatile contaminants. The process provides reduced overall energy consumption, lower capital cost with improved simplicity of operation, better process control, reduced corrosion and reduced maintenance costs with concomitant increase in productivity.

A specific object of this invention is to provide a method of advantageously vaporizing liquid sulphur dioxide utilizing microwave energy. This process uses the third type of heat transfer, namely, radiation, in the form of microwave radiation.

Microwave energy in the 800-3000 MHz range has been widely used for cooking and reheating of foods in microwave ovens. Frequencies of approximately 915 and approximately 2450 MHz are the ones primarily used in North America for this purpose, although other frequencies, notably 5850 MHz and 18000 MHz, are also available. In Western Europe, 896 MHz is generally used, and in Japan 100-450 kHz or 40-50 MHz is generally used.

An example of the industrial use of microwave radiation has been described in U.K. Pat. No. 1,567,129, in the name of Foster Wheeler Energy Corporation. In U.K. Pat. No. 1,567,129 microwave radiation is used to desorb any adsorbed sulphur dioxide from coal, coke or char by subjecting the coal and the like to radiation at a frequency sufficient to cause arcing, thereby oxidizing a portion of the carbon and thus increasing the temperature of the coal.

However, despite the successful application of microwave radiation to foodstuffs, the stigma of microwave equipment poorly designed to meet the needs of the chemical process industry has severely hampered its utility in this field. In addition, microwave technology generally suffers from the reputation of being prohibitively expensive.

When highly contaminated liquid sulphur dioxide is vaporized utilizing microwave energy according to the process of the invention, the contaminants are found to have a negligible effect on the overall heat transfer. This results in a negligible fouling factor which increases the energy efficiency of heat transfer and reduces maintenance down-time.

The principle non-volatile impurities in liquid sulphur dioxide comprise organic oils, elemental sulphur and traces of inorganic compounds. In each instance, contaminants do not appreciably affect the microwave field nor appreciably interact, through absorption, with microwave energy. As a consequence, the contaminant concentration in the sulphur dioxide liquid feed vaporizer, or heat exchanger, can increase to levels which are orders of magnitude larger than levels currently acceptable in the present art processes.

Accordingly, the invention provides a process for the generation of sulphur dioxide vapour from contaminated liquid sulphur dioxide feed comprising subjecting said liquid sulphur dioxide feed to microwave energy for a sufficient period of time to produce sulphur dioxide vapour, collecting said sulphur dioxide vapour and removing resultant contaminated liquid sulphur dioxide, if any.

The generation of sulphur dioxide vapour from the contaminated liquid feed can be effected by microwave irradiation either in a batch process or, preferably, in a continuous process. A batch system generally involves the use of a reaction pot or vessel inside a microwave oven and containing the liquid during the irradiation step and, optionally, means, such as a vacuum system, for removing the sulphur dioxide produced as vapour.

After the volume of liquid sulphur dioxide has been reduced to a selected degree it is removed from the reaction pot. Alternatively, all of the liquid sulphur dioxide may be vaporized whereby the contaminant material would be either left as deposits on the surfaces of the pot or itself volatalized from the pot if subjected to sufficient microwave irradiation.

Clearly, the time required to achieve the desired volume of sulphur dioxide vapour depends on the volume of liquid to be vaporzied and the wavelength and intensity of the microwave radiation used.

In a preferred process, the liquid sulphur dioxide feed is continuously introduced to a microwave field applicator wherein it is subjected to microwave radiation as it passes through the applicator along a quartz tube. Unvaporized sulphur dioxide is allowed to exit from the quartz tube having an increased level of contaminant material which may be removed by filtration or other appropriate technique, to permit recycle of the sulphur dioxide liquid as feed.

Thus, in a preferred form, the invention provides a process as hereinbefore defined further comprising continuously introducing said liquid sulphur dioxide feed through a microwave field applicator wherein said feed is subjected to said microwave energy, collecting said sulphur dioxide vapour and spent liquid sulphur dioxide.

A further advantage of the present invention stems from the use of microwave power. As described, hereinbefore, the current art is caught in a trade-off between corrosion resistant materials of construction and heat transfer coefficients—the latter of which determines equipment size. The use of construction materials which transmit microwaves without interaction, such as quartz and which have limited use with the current art are most desirable in the present invention. Such materials are generally extremely resistant to corrosion, yet are invisible and do not interact with the microwave field. This permits efficiencies of microwave field utilization of greater than 90%.

A further advantage of using microwave radiation according to the process of the invention is that liquid sulphur dioxide absorbs the electromagnetic energy uniformly, inside the container means holding the liquid or through which it passes, e.g., a quartz pot or a quartz tube inside the microwave field applicator, and not just at the surface of the container. The heat buildup takes place extremely rapidly and is controlled, almost instantaneously, by the power applied. Since the energy transfer occurs by radiation rather than surface-to-surface contact, the attainable temperature is limited primarily by the rate of sulphur dioxide emission from the liquid being processed.

Not all materials absorb microwave radiation. Some materials, such as metals, reflect microwaves, while others, such as paper, glass and many plastics, transmit the waves without interaction. Thus, in the process and apparatus according to the invention, any material which transmits microwave radiation without interaction and is not attacked by sulphur dioxide represents a desirable material of construction—glass or quartz are preferred examples. The desirability of glass or glass-lined container means of use in instant invention may be contrasted to prior art systems wherein glass is not employed because of the thermal shock that can be produced due to the surface-to-surface heating and because of its poor heat transfer coefficient. However, in instant process, these disadvantages are not present.

In the case of microwave induced vaporization, wall temperatures are generally never higher than those of the bulk of the liquid and, are, indeed, usually cooler. Thus, from an energy balance consideration, the microwave process is most efficient because it places the energy exactly where it is required, i.e., in the body of the liquid. Furthermore, as soon as the microwave power is interrupted, heat transfer/vaporization ceases. This results in greater process control than is seen in the present art wherein the heated surfaces remain hot even though the heat source has been terminated. Since it is well known that microwave energy interacts poorly with gases/vapours, and since the wall temperatures surrounding the liquid are cooler than in the present art, the vapours exiting the microwave vaporizer will be cooler than those exiting a conventional heat exchanger. In some applications, this may save the cost of cooling the vapour and troublesome engineering design.

Thus, an advantage of using microwave radiation according to the process of the invention is that relating to total energy costs. In the prior art techniques, generally, steam is consumed in order to raise the liquid sulphur dioxide to the requisite temperature to facilitate sulphur dioxide vapour generation. In the process according to the invention efficiencies of microwave field utilization of greater than 90% when coupled with 75% efficiency of electric line power to microwave energy provide advantageous energy savings.

The above processes can be carried out utilizing equipment similar to that used in commercial microwave heating in the food industry. Such equipment is well known in the art. It would, of course, have to be modified because of the peculiarities of sulphur dioxide processing and the volumes of vapours evolved.

Accordingly, in a further feature the invention provides apparatus for the generation of sulphur dioxide from liquid sulphur dioxide feed comprising container means for containing said liquid feed, microwave means for subjecting said liquid feed in said container means to microwave energy for a sufficient period of time to effect production of sulphur dioxide vapour whereby said liquid feed is depleted in volume to a desired degree, means for removing said sulphur dioxide vapour and means for collecting spent liquid sulphur dioxide.

The container means can be a reaction pot or vessel, or preferably a glass or quartz tubular reactor disposed within a microwave field applicator.

Thus, in a preferred feature the invention provides apparatus as hereinabove defined wherein said container means comprises a glass or quartz tubular reactor disposed within a microwave field applicator.

In the preferred process of the invention hereinbefore described, liquid sulphur dioxide containing a large amount of contaminants, is fed through a microwave field applicator to interact with the microwave energy. In such a process, the degree of interaction between the liquid and the microwave field is controlled by the attenuation constant and penetration depth. These are, of course, dependent on the dielectric properties of the liquid sulphur dioxide. If it turns out that the penetration depth is either considerably less or considerably greater than the dimensions of the object to be heated, the efficiency of the interaction between the microwave energy and the liquid $SO^2$ will decrease. In this situation, special applicator techniques may be required to realize acceptable utilization of microwave power. Penetration depth can be controlled by wavelength, $\lambda$. In simple systems, 915 MHz energy has a penetration depth roughly three times that of 2450 MHz energy.

In an alternative embodiment where a sulphur dioxide-air gaseous mixture is desired and the concentration of sulphur dioxide in said gaseous mixture need not be so carefully controlled, dry air may be sparged through the liquid sulphur dioxide feed simultaneously with microwave irradiation of the feed.

Accordingly, in a further feature the invention provides processes as hereinbefore defined further comprising passing dry air through said sulphur dioxide liquid feed while said liquid feed is subjected to said microwave energy to produce a sulphur dioxide-air mixture, and collecting said sulphur dioxide-air mixture and spent liquid sulphur dioxide, if any.

Preferably, the microwave energy is applied at a frequency of 915, 2450, 5850, or 18,000 MHz.

In order that the invention may be better understood, several embodiments will now be described by way of example only and with reference to the drawings wherein:

FIG. 1 is a schematic diagram of a preferred apparatus and process according to the invention; and FIG. 2 is a schematic diagram of an alternate embodiment of the apparatus and process according to the invention.

FIG. 1 shows a tubular quartz reactor (2.5 cm O.D.) 1 fitted inside a microwave applicator 2 linked to a commercial microwave generator 3.

The generator 3 further comprises a slide screw tuner 4 to minimize reflected power, directional couplers 5 and 6 to couple forward and reflected power and circulator 7 to prevent reflected power from reaching microwave power source 8. Each of above form part of a waveguide 9. The waveguide in the applicator terminates with a shorting plate 10.

The microwave applicator is designed to efficiently deliver the microwave field to the reactor 1. The dimensions of the waveguide are designed to support a standing wave and can be easily determined by those skilled in the art. In the embodiment shown the WR340 waveguide dimensions of 15 cm long by 8.5 cm high by 4.2 cm deep support a standing wave of 2450 MHz and provides an interaction zone of approximately 30 cm.

Reactor 1 has a sulphur dioxide liquid feed inlet 11 and outlet 12. Outlet 12 is attached to an upper line 13 and lower spent, contaminated liquid line 14. Line 13 leads to a sulphur dioxide vapour holding tank 15 having an exit line 16 fitted with sulphur dioxide flowmeter 17.

In operation, liquid sulphur dioxide feed is fed through quartz reactor 1 at a depth of 1 cm and the microwave interaction provided by the 1 kilowatt 2450 MHz magnetron is optimized for maximum efficiency. The interaction of the microwave field and the liquid feed results, when both energy transfer to the feed and feed temperature is sufficiently high, in a stream of sulphur dioxide vapour which exits along line 13, and a spent contaminated liquid stream which exits along line 14. The sulphur dioxide vapour may be used directly or held in a holding tank 15. The spent, contaminant sulphur dioxide liquid may be filtered and recycled to quartz tube 1.

The above embodiment describes a continuous process for the generation of sulphur dioxide. The exact conditions necessary to carry out the above continuous process will be dependent on the liquid flow rate and wavelength of microwave radiation used and can be easily determined by those skilled in the art. Sufficient microwave power to generate the required flow rate of vapour sulphur dioxide is applied and wherein the flow rate of vapour sulphur dioxide increases with increasing power. The contaminants in the liquid sulphur dioxide remain in the waveguide cavity and are allowed to build up to levels which would be considered unacceptable in the current art based on fouling factors. These levels did not affect the flow rate in the processes of the present invention.

FIG. 2 shows an alternative embodiment of a process and apparatus according to the invention involving a noncontinuous or batch process. It shows a Litton commercial microwave oven chamber 1 modified to accept a glass pot 2 connected to a flow meter 3. In this process, the glass vessel 2 contains liquid sulphur dioxide 4 which is irradiated with microwave energy (2450 MHz) sufficient to produce a stream of sulphur dioxide vapour which may contain a small amount of other gases (e.g. dissolved air). The vapour is then sent for process application.

I claim:

1. A process for the generation of sulphur dioxide vapour from contaminated liquid sulphur dioxide comprising subjecting liquid sulphur dioxide feed to microwave energy applied at a frequency of 915, 2450, 5850, or 18,000 MHz for a sufficient period of time to produce sulphur dioxide vapour, collecting said vapour and removing resultant contaminated liquid sulphur dioxide, if any.

2. A process as claimed in claim 1 comprising continuously introducing said liquid sulphur dioxide feed through a microwave field applicator wherein said feed is subjected to said microwave energy, collecting said vapour and resultant contaminated liquid sulphur dioxide.

3. A process as claimed in claim 2 wherein said liquid sulphur dioxide feed is passed through a quartz or glass tubular reactor disposed within said microwave field applicator.

4. A process as claimed in any one of claims 1 to 3 further comprising passing dry air through said liquid sulphur dioxide feed while said feed is subject to said microwave energy to produce a sulphur dioxide-air gaseous mixture, collecting said gaseous mixture and said resultant contaminated sulphur dioxide, if any.

* * * * *